United States Patent
Li et al.

(10) Patent No.: US 11,639,429 B2
(45) Date of Patent: May 2, 2023

(54) PRE-DRIED POLYSTYRENE/ALUMINA COMPOUND FOR FOAM EXTRUSION

(71) Applicant: FINA TECHNOLOGY, INC., Houston, TX (US)

(72) Inventors: Fengkui Li, Houston, TX (US); Jayna Brown, Houston, TX (US); Jon David Tippet, League City, TX (US); Kenneth P. Blackmon, Houston, TX (US); David W. Knoeppel, League City, TX (US); John R. Gaustad, Friendswood, TX (US); Wyman T. Stephens, Baytown, TX (US); Ying Wang, Houston, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 290 days.

(21) Appl. No.: 16/985,097

(22) Filed: Aug. 4, 2020

(65) Prior Publication Data
US 2021/0040286 A1    Feb. 11, 2021

Related U.S. Application Data

(60) Provisional application No. 62/884,289, filed on Aug. 8, 2019.

(51) Int. Cl.
*C08J 9/28*    (2006.01)
*C08K 3/22*    (2006.01)
*C08K 5/02*    (2006.01)

(52) U.S. Cl.
CPC ....... *C08J 9/28* (2013.01); *C08K 3/22* (2013.01); *C08K 5/02* (2013.01); *C08J 2325/06* (2013.01); *C08K 2003/2227* (2013.01)

(58) Field of Classification Search
CPC ........ C08J 9/28; C08J 2325/06; C08J 9/0066; C08J 2203/142; C08J 9/122; C08J 9/144; C08J 2201/03; C08J 2203/06; C08J 2203/162; C08J 2325/04; C08J 2323/12; C08J 2325/08; C08J 2325/14; C08J 2351/04; C08J 9/0023; C08K 3/22; C08K 5/02; C08K 2003/2227; C08K 5/103; C08L 51/04; C08L 25/06; C08L 25/12; C08L 25/14; B29C 48/0012
See application file for complete search history.

(56) References Cited

U.S. PATENT DOCUMENTS

| | | | | |
|---|---|---|---|---|
| 5,776,389 A | * | 7/1998 | Chaudhary | C08J 9/141 264/53 |
| 9,914,814 B2 | * | 3/2018 | Wang | C08J 9/0023 |
| 2011/0306691 A1 | * | 12/2011 | Sosa | C08J 9/125 521/79 |
| 2012/0025126 A1 | * | 2/2012 | Vo | C08J 9/0066 252/62 |

FOREIGN PATENT DOCUMENTS

| WO | WO-2010111106 A1 | * | 9/2010 | ............ C08J 9/0066 |
| WO | 2014/066089 A1 | | 5/2014 | |
| WO | WO-2015116548 A1 | * | 8/2015 | ............ C08J 9/0061 |

OTHER PUBLICATIONS

Canadian Office Action dated Jan. 30, 2023, for Canadian Application No. 3,143,727 (4 p.).
PCT/US2020/044906 International Search Report and Written Opinion dated Oct. 20, 2020 (9 p.).
GCC Examination Report dated Sep. 8, 2021, for GCC Application No. 2020-40259 (5 p.).
European Communication Under Rule 161 and 162 dated Mar. 31, 2022, for European Application No. 20757493.0 (3 p.).

* cited by examiner

*Primary Examiner* — Irina S Zemel
(74) *Attorney, Agent, or Firm* — Albert Shung

(57) ABSTRACT

A polystyrene (PS) composition for making an extruded foam, the PS composition comprising: a dried PS/alumina compound comprising a PS and an alumina additive, wherein the dried PS/alumina compound has a moisture content, measured by Coulometer, that is less than or equal to about 0.05 weight percent (wt %); and a blowing agent.

20 Claims, 3 Drawing Sheets

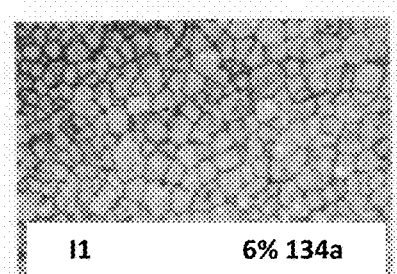 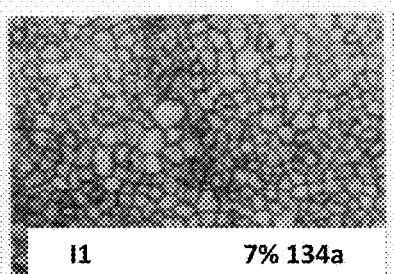 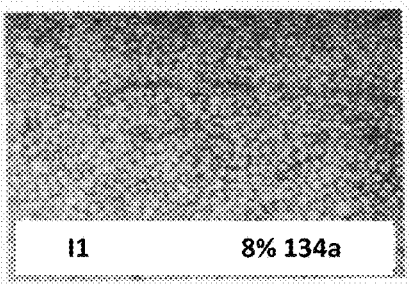
FIGURE 3A  FIGURE 3B  FIGURE 3C
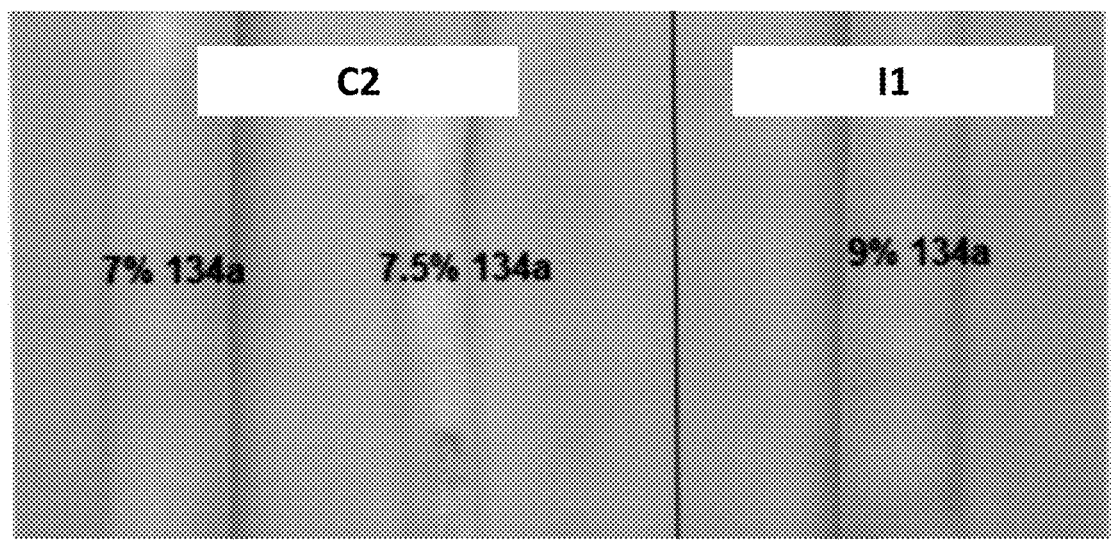
FIGURE 4

PRE-DRIED POLYSTYRENE/ALUMINA COMPOUND FOR FOAM EXTRUSION

CROSS-REFERENCE TO RELATED APPLICATIONS

This application claims the benefit of U.S. Provisional Patent Application No. 62/884,289, filed Aug. 8, 2019, which is incorporated by reference herein in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present disclosure relates to the production of polystyrene (PS) foams. More particularly, the present disclosure provides PS compositions and methods for increasing the solubility of blowing agent(s) during PS foam extrusion. Still more particularly, the present disclosure provides PS compositions and methods for producing PS foams having desirable insulative properties, and PS foams produced thereby.

BACKGROUND

Polystyrene can be foamed and formed into a variety of articles, such as foam rods, planks, and sheets are well known in the art. Polystyrene (PS) foams formed utilizing hydrofluorocarbon (HFC) blowing agents, such as HFC 134a, can be used for the construction of insulation boards. High HFC blowing agent concentrations are desirable in the foam boards for superior insulation properties (e.g., as measured by R-value). The physical blowing agents commonly used (e.g., hydrochlorofluorocarbons (HCFCs), hydrofluorocarbons (HFCs), or combinations thereof) can lead to the formation of smog, have high ozone depletion potential or global warming potential (GWP), and/or can be hazardous air pollutants. For example, due to its high GWP (global warming potential), some HFCs, including HFC 134a, will be banned by 2021. Thus, a need exists for alternatives to HFCs, such as HFC 134a. Hydrofluoroolefins (HFOs) appear to be one of the candidates due to the zero GWPs thereof.

Despite the advances in foam production, there still exists a further need for a simple and economical approach to achieving enhanced blowing agent solubility including both HFCs and HFOs in polystyrene compositions for foam extrusion and/or to enhance retention of the blowing agent(s) in polystyrene foams.

SUMMARY

Herein disclosed is a polystyrene (PS) composition for making an extruded foam, the PS composition comprising: a dried PS/alumina compound comprising a PS and an alumina additive, wherein the dried PS/alumina compound has a moisture content, measured by Coulometer, that is less than or equal to about 0.05 weight percent (wt %); and a blowing agent. Also disclosed herein is a low density polystyrene (PS) foam produced via extrusion of the PS composition, wherein the low density PS foam contains a higher blowing agent concentration than that of an otherwise similar low density PS foam produced via extrusion of a PS composition that does not contain the dried PS/alumina compound. Further disclosed herein is a low density polystyrene (PS) foam produced via extrusion of the PS composition, wherein the low density PS foam exhibits at least one superior insulative property relative to that of an otherwise similar low density PS foam produced via extrusion of a PS composition that does not contain the dried PS/alumina compound. Also disclosed herein is a low density polystyrene (PS) foam produced via extrusion of the PS composition, wherein the low density PS foam exhibits at least one mechanical property that is at least comparable to that of an otherwise similar low density PS foam produced via extrusion of a PS composition that does not contain the dried PS/alumina compound. Further disclosed herein is a low density polystyrene (PS) foam produced via extrusion of the PS composition, wherein the blowing agent comprises one or more hydrofluoroolefins (HFOs), and wherein the low density PS foam exhibits at least one insulative property that is at least equivalent to that of an otherwise similar low density PS foam produced via extrusion of a PS composition that does not contain the dried PS/alumina compound and comprises one or more blowing agents selected from the group consisting of hydrofluorocarbons (HFCs).

Also disclosed herein is a method of producing a low density polystyrene (PS) foam, the method comprising: forming a polystyrene (PS)/alumina compound comprising a PS and an alumina additive; removing moisture from the PS/alumina compound to form a dried PS/alumina compound, wherein the dried PS/alumina compound has a moisture content, measured by a Coulometer, that is less than or equal to about 0.05 weight percent (wt %); blending the dried PS/alumina compound, a blowing agent, and optionally one or more additional additives to form a foamable mixture; and producing a foam by extruding the foamable mixture through a die and into a region of reduced pressure. A low density polystyrene (PS) foam produced via the method is also provided. In embodiments, the low density PS foam contains a higher blowing agent concentration and/or exhibits at least one superior insulative or mechanical property relative to that of an otherwise similar low density PS foam produced via extrusion of a foamable mixture that does not contain the dried PS/alumina compound.

Also disclosed herein is a dried polystyrene (PS)/alumina compound for making an extruded foam, the dried PS/alumina compound comprising an extrusion mixture of a PS and an alumina additive, wherein the extrusion mixture has been dried to provide the dried PS/alumina compound such that the dried PS/alumina compound has a moisture content, measured by a Coulometer, of less than or equal to about 0.05 weight percent (wt %), wherein the dried PS/alumina compound comprises from about 0.01 to about 20.0 weight percent (wt %) of the alumina additive.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 1A provides an image of a first comparative foam sample C1 of Example 1 comprising 7 wt % of the blowing agent HFC 134a;

FIG. 1B provides an image of a first comparative foam sample C1 of Example 1 comprising 8 wt % of the blowing agent HFC 134a;

FIG. 2A provides an image of a second comparative foam sample C2 of Example 1 comprising 6 wt % of the blowing agent HFC 134a;

FIG. 2B provides an image of a second comparative foam sample C2 of Example 1 comprising 7 wt % of the blowing agent HFC 134a;

FIG. 3A provides an image of an inventive foam sample I1 of Example 1 comprising 6 wt % of the blowing agent HFC 134a;

FIG. 3B provides an image of an inventive foam sample I1 of Example 1 comprising 7 wt % of the blowing agent HFC 134a;

FIG. 3C provides an image of an inventive foam sample I1 of Example 1 comprising 8.5 wt % of the blowing agent HFC 134a;

FIG. 4 shows a side by side comparison of second comparative foam samples C2 of Example 1 comprising 7 wt % and 7.5 wt % HFC 134a and an inventive foam sample I1 of Example 1 comprising 9 wt % HFC 134a;

DETAILED DESCRIPTION

Figure 1A:
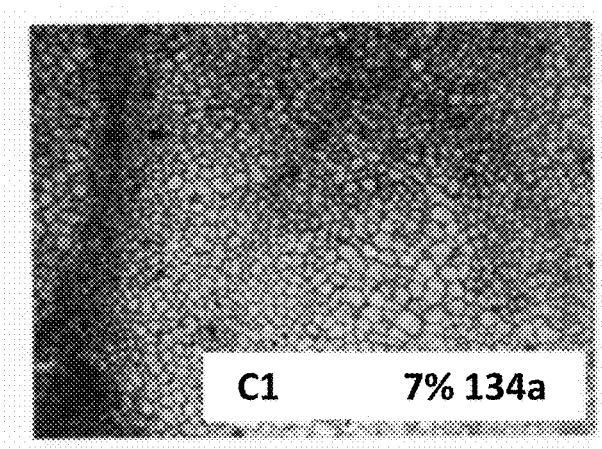

It should be understood at the outset that although an illustrative implementation of one or more embodiments are provided below, the disclosed compositions, methods, and/or products may be implemented using any number of techniques, whether currently known or in existence. The disclosure should in no way be limited to the illustrative implementations, drawings, and techniques illustrated hereinbelow, including the exemplary designs and implementations illustrated and described herein, but may be modified within the scope of the appended claims along with their full scope of equivalents. This disclosure describes dried polystyrene (PS)/alumina compounds for use in polystyrene (PS) compositions comprising the dried PS/alumina compound and a blowing agent. It has been unexpectedly discovered that utilization of the dried PS/alumina compounds and PS compositions comprising same enable PS to retain a greater concentration of blowing agent(s) in the finished PS foams, improve the solubility of physical blowing agents such as, without limitation, HFCs (hydrofluorocarbons), HFOs (hydrofluoroolefins), and carbon dioxide ($CO_2$), in polystyrene during foam extrusion, and/or increase a retention of the blowing agent(s) in the resulting PS foam. Specifically, the PS compositions comprise a dried PS/alumina compound comprising a PS (e.g., crystal polystyrene) and an alumina additive, wherein the dried PS/alumina compound has a moisture content, measured by a Coulometer, that is less than or equal to about 0.1, 0.05, 0.04, 0.03, 0.02, 0.01, or 0 weight percent (wt %); and a blowing agent.

In embodiments, the PS compositions of this disclosure have broader foam extrusion processing windows, as indicated by foamability at higher blowing agent concentration and/or a wider range of temperatures. In embodiments, PS foams (e.g., low density PS foams) resulting from extrusion/blowing of the herein-disclosed PS compositions possess a higher blowing agent (e.g., HFC or HFO) concentration (e.g., due to a desired high blowing agent solubility during foam extrusion), an increased blowing agent retention in the resulting PS foam, and/or enhanced foam mechanical properties (e.g., superior insulative properties). A potential advantage of the PS compositions of this disclosure is that such compositions may enable polystyrene insulation board manufacturers to replace the commonly used HFC 134 with low GWP (global warming potential) blowing agents, such as HFO.

In embodiments, the utilization of a dried PS/alumina compound to form a PS composition of this disclosure increases the blowing agent solubility in the PS composition (and thus in the resulting PS foam) by at least 10, 20, or 30% during foam extrusion. The alumina additive can, in embodiments, be present in the dried PS/alumina compound in a range of from about 0.01 to about 20.0 percent by weight (wt %). In embodiments, a solubility of the blowing agent in the PS composition is greater than or equal to about 6.5, 7, 7.5, or 8 weight percent.

Two major challenges exist for the use of HFOs as blowing agents. Firstly, HFOs are very expensive refrigerants/foam blowing agents, and, secondly, HFOs may have relatively low solubility in polystyrene as compared with conventional blowing agents, such as HFC 134a, thus making it difficult to achieve desired insulation properties in the resulting foam product. Additionally, polystyrene does not typically exhibit favorable foaming behavior when physical blowing agents, such as carbon dioxide, are used. Particularly, when used as a physical blowing agent in traditional polystyrene foam processes, carbon dioxide produces nondescript masses of polymeric material or otherwise poor quality thermoplastic foams that tend to collapse. Without being limited by theory, this may be the result of a lack of polymer-gas compatibility and limited solubility of carbon dioxide within the molten thermoplastic extrudate, which lead to the production of an uncontrollably high level of open cells in the foam structure as the thermoplastic/blowing agent combination exits the die. Additionally, even if the resultant foams have a visible foam structure, the foams tend to collapse quickly due to the relatively high permeability of carbon dioxide relative to air (i.e., the cells can collapse due to the partial vacuum created by the rapid escape of the carbon dioxide from the cells) and become unsuitable for most practical applications within hours of being manufactured. Via this disclosure, non-HFC blowing agents, such as HFOs and $CO_2$, may be utilized as blowing agent or co-blowing agent in certain low density PS foam applications. In embodiments, the dried PS/alumina compound containing PS compositions of this disclosure may enable transitioning to a non-flammable, inexpensive, and low GWP (global warming potential) blowing agent, such as $CO_2$, with enhanced blowing agent solubility during extrusion and/or enhanced retention of the blowing agent in the produced foam.

This disclosure describes dried polystyrene (PS)/alumina compounds for use in polystyrene (PS) compositions comprising the dried PS/alumina compound and a blowing agent. It has been unexpectedly discovered that utilization of the dried PS/alumina compounds and PS compositions comprising same enable PS to retain a greater concentration of blowing agent(s) in the finished PS foams, improve the solubility of physical blowing agents such as, without limitation, HFCs (hydrofluorocarbons), HFOs (hydrofluoroolefins), and carbon dioxide ($CO_2$), in polystyrene during foam extrusion, and/or increase a retention of the blowing agent(s) in the resulting PS foam. Specifically, the PS compositions comprise a dried PS/alumina compound comprising a PS (e.g., crystal polystyrene) and an alumina additive, wherein the dried PS/alumina compound has a moisture content, measured by a Coulometer, that is less than or equal to about 0.05 weight percent (wt %); and a blowing agent.

In embodiments, the PS compositions of this disclosure have broader foam extrusion processing windows, as indicated by foamability at higher blowing agent concentration and/or a wider range of temperatures. In embodiments, PS foams (e.g., low density PS foams) resulting from extrusion/blowing of the herein-disclosed PS compositions possess a higher blowing agent (e.g., HFC or HFO) concentration (e.g., due to a desired high blowing agent solubility during foam extrusion), an increased blowing agent retention in the resulting PS foam, and/or enhanced foam mechanical properties (e.g., superior insulative properties). A potential advantage of the PS compositions of this disclosure is that such compositions may enable polystyrene insulation board manufacturers to replace the commonly used HFC 134 with low GWP (global warming potential) blowing agents, such as HFO.

In embodiments, the utilization of a dried PS/alumina compound to form a PS composition of this disclosure increases the blowing agent solubility in the PS composition (and thus in the resulting PS foam) by at least 10, 20, or 30% during foam extrusion. The alumina additive can, in embodiments, be present in the dried PS/alumina compound in a range of from about 0.01 to about 20.0 percent by weight (wt %).

Two major challenges exist for the use of HFOs as blowing agents. Firstly, HFOs are very expensive refrigerants/foam blowing agents, and, secondly, HFOs may have relatively low solubility in polystyrene as compared with conventional blowing agents, such as HFC 134a, thus making it difficult to achieve desired insulation properties in the resulting foam product. Additionally, polystyrene does not typically exhibit favorable foaming behavior when physical blowing agents, such as carbon dioxide, are used. Particularly, when used as a physical blowing agent in traditional polystyrene foam processes, carbon dioxide produces nondescript masses of polymeric material or otherwise poor quality thermoplastic foams that tend to collapse. Without being limited by theory, this may be the result of a lack of polymer-gas compatibility and limited solubility of carbon dioxide within the molten thermoplastic extrudate, which lead to the production of an uncontrollably high level of open cells in the foam structure as the thermoplastic/blowing agent combination exits the die. Additionally, even if the resultant foams have a visible foam structure, the foams tend to collapse quickly due to the relatively high permeability of carbon dioxide relative to air (i.e., the cells can collapse due to the partial vacuum created by the rapid escape of the carbon dioxide from the cells) and become unsuitable for most practical applications within hours of being manufactured. Via this disclosure, non-HFC blowing agents, such as HFOs and $CO_2$, may be utilized as blowing agent or co-blowing agent in certain low density PS foam applications. In embodiments, the dried PS/alumina compound containing PS compositions of this disclosure may enable transitioning to a non-flammable, inexpensive, and low GWP (global warming potential) blowing agent, such as $CO_2$, with enhanced blowing agent solubility during extrusion and/or enhanced retention of the blowing agent in the produced foam.

While the following terms are believed to be well understood by one of ordinary skill in the art, the following definitions are set forth to facilitate explanation of the presently disclosed subject matter. Unless defined otherwise, all technical and scientific terms used herein have the same meaning as commonly understood to one of ordinary skill in the art to which the presently disclosed subject matter belongs.

Styrene, also known, as vinyl benzene, is an aromatic compound that is produced in industrial quantities from ethylbenzene. The most common method of styrene production comprises the dehydrogenation of ethylbenzene, which produces a crude product of styrene monomer and unreacted ethylbenzene and hydrogen. Polystyrene is an aromatic polymer produced from the styrene monomer. Polystyrene is a widely used polymer found in insulation, packaging, and disposable cutlery, as well as foamed products including foam cups.

Different types of polystyrene materials can include general-purpose polystyrene (GPPS) and high impact polystyrene (HIPS). Many conditions affect the properties of the resulting product, including processing time, temperature, pressure, purity of the monomer feedstock, and the presence of additives or other compounds. These and other processing conditions alter the physical and chemical properties of the polystyrene product, affecting the suitability for a desired use.

Foamed polystyrene offers the advantages of low cost, light weight and high structural strength for its density. A typical polystyrene foam also has a relatively high impact resistance and possesses excellent electrical and thermal insulation characteristics. Foamed polystyrene is useful in a variety of applications such as insulation, packaging, coolers, food packaging, decorative pieces, and dunnage used to protect and secure cargo during transportation. Additionally, polystyrene foams are commonly classified into three general categories: low density, medium density, and high density. Low density polystyrene foams usually have a density of from about 1 to about 3 $lb/ft^3$ whereas medium density foams may have a density ranging from about 4 to about 19 $lb/ft^3$ and high density foams often have a density ranging from 20 to about 30 $lb/ft^3$.

The two main types of polystyrene foams are extruded polystyrene (XPS) foam and expanded polystyrene (EPS) foam. Extruded polystyrene foam is typically formed by mixing polystyrene with additives and blowing agents into an extruder that heats the mixture. The mixture is then extruded, foamed to the desired shape, and cooled. Expanded polystyrene foam is typically formed by expanding solid polystyrene beads containing a blowing agent such as pentane with steam or hot gas. These pre-expanded beads may later be molded into the desired shape and expanded again with steam or hot gas to fuse the beads together.

The term "blowing agent" as used herein refers to any of a wide variety of substances that alone or in combination with at least one other substance is capable of producing a cellular structure in a plastic mass. Thus, the term includes, but is not limited to, gases that expand when pressure is released, soluble solids that leave pores when leached out, liquids that develop cells when they change to gases, and/or chemical agents that decompose or react under the influence of heat to form a gas.

In the production of extruded polystyrene foam, it is common to utilize blowing agents such as methyl chloride, ethyl chloride, chlorocarbons, fluorocarbons (including HFCs) and chlorofluorocarbons (CFCs). However, such blowing agents have been heavily regulated due to potential environmental impact including ozone depletion or global warming. An ongoing trend in extrusion foaming process development is to find environmentally benign chemicals as blowing agents. Some foaming processes have been using hydrofluoroolefins (HFOs) or carbon dioxide ($CO_2$) as the blowing agent or co-blowing agent. For desired insulating properties, HFOs are preferred due to their low thermal conductivity and minimal environmental impact. However, HFO solubility in polystyrene needs further improvement, such as provided herein, in order to meet the stringent regulatory requirement for the construction insulation foam boards.

The term "thermoplastic foam" refers to a cellular polymer wherein numerous gas bubbles or cells are distributed in a polymer matrix that can be repeatedly heated, melted, shaped, and cooled. As a result, thermoplastic foams can be easily melted and recycled. The polystyrene foams produced according to this disclosure may be thermoplastic foams.

Although the majority of the above definitions are substantially as understood by those of skill in the art, one or more of the above definitions can be defined hereinabove in a manner differing from the meaning as ordinarily understood by those of skill in the art, due to the particular description herein of the presently disclosed subject matter.

Herein-disclosed are polystyrene (PS) compositions (also referred to herein as 'PS blends', 'PS formulations' or 'foamable mixtures') for making a polystyrene foam. The herein-disclosed PS composition comprises a dried PS/alumina compound comprising a PS and an alumina additive. The dried PS/alumina compound has a moisture content, measured by a Coulometer, that is less than or equal to about 0.05 weight percent (wt %). The dried PS/alumina compound can be produced by forming a polystyrene (PS)/ alumina compound comprising a PS and an alumina additive, and removing moisture from the PS/alumina compound to form the dried PS/alumina compound, wherein the dried PS/alumina compound has a moisture content, by a Coulometer, that is less than or equal to about 0.05 weight percent (wt %). Alternatively, combination of the PS and the alumina additive results in the dried PS/alumina compound, i.e., the PS and the alumina additive are of sufficient dryness that combination thereof (without further moisture removal) results in a PS/alumina compound having the required moisture content, measured by a Coulometer, that is less than or equal to about 0.05 weight percent (wt %), such that the PS/alumina compound is considered a dried PS/alumina compound. As detailed hereinbelow, the PS composition of this disclosure can further comprise a blowing agent (e.g., one blowing agent, or a plurality of blowing agents). Additional additives, described hereinbelow, may be included in the PS composition (e.g., incorporated into the dried PS/alumina compound or combined therewith to form the polystyrene composition). For example, as described further hereinbelow, such additional additives can include SRA's, antioxidants, flame retardants, or a combination thereof.

The PS composition of this disclosure comprises polystyrene, incorporated therein via the dried PS/alumina compound. Various polystyrene homopolymers and copolymers can be used, as well as high impact polystyrenes (HIPS) constructed through polymerization or irradiation techniques. In embodiments, the PS can comprise crystal polystyrene (also referred to as general purpose polystyrene (GPPS)), high impact polystyrene (HIPS), PS copolymers, or a combination thereof. In embodiments, the polystyrene copolymer may contain a metallic monomer. For example, in embodiments, the metallic monomer comprises zinc dimethylacrylate (ZDMA). Suitable polystyrene copolymers can include a wide variety of polymers, such as, but not limited to, glycidyl methacrylate, 2-hydroxyethyl methacrylate copolymers, acrylonitrile, etc. In embodiments, suitable polystyrene can be derived from petroleum-based resources and/or bio-based resources.

In embodiments, the polystyrene of the herein-disclosed dried PS/alumina compound and PS composition has a melt flow rate (MFR), as measured by D1238, in the range of from 0.2 to 30 grams (g)/10 minutes (min), from 1.0 to 20 g/10 min, or from 1.0 to 10.0 g/10 min.

In embodiments, the dried PS/alumina compound and PS composition of this disclosure comprise crystal polystyrene. The crystal PS may be characterized by a melt flow rate of from 0.2 g/10 min to 30 g/10 min, from 1.0 g/10 min to 20 g/10 min, or from 1.0 g/10 min to 10.0 g/10 min, as determined in accordance with ASTM D-1238; a tensile strength of from 6,000 psi to 8,000 psi (from 41.4 to 55.2 MPa), from 6,500 psi to 8,000 psi (from 44.8 to 55.2 MPa), or from 7,000 psi to 8,000 psi (from 48.3 to 55.2 MPa), as determined in accordance with ASTM D-638; a tensile modulus of from 400,000 psi to 480,000 psi (from 2.8 to 3.3 GPa), from 420,000 psi to 460,000 psi (from 2.9 to 3.2 GPa), or from 430,000 psi to 450,000 psi (from 3.0 to 3.1 GPa), as determined in accordance with ASTM D-638; a flexural modulus of from 400,000 psi to 480,000 psi (from 2.8 to 3.3 MPa), from 420,000 psi to 460,000 psi (from 2.9 to 3.2 MPa), or from 430,000 psi to 450,000 psi (from 3.0 to 3.1 MPa), as determined in accordance with ASTM D-790; a flexural strength from 10,000 psi to 15,000 psi (from 68.9 to 103.4 MPa), from 12,000 psi to 14,000 psi (from 82.7 to 96.5 MPa), or from 13,000 psi to 14,000 psi (from 89.6 to 96.5 MPa), as determined in accordance with ASTM D-790; an annealed heat distortion of from 190° F. to 220° F. (from 87.8° C. to 104.4° C.), from 200° F. to 220° F. (from 93.3° C. to 104.4° C.), or from 210° F. to 220° F. (from 98.9° C. to 104.4° C.), as determined in accordance with ASTM D-648; and/or a Vicat softening of from 200° F. to 230° F. (from 93.3° C. to 110.0° C.), from 210° F. to 230° F. (from 98.9° C. to 110.0° C.), or from 215° F. to 225° F. (from 101.7° C. to 107.2° C.), as determined in accordance with ASTM D-1525.

In embodiments, the dried PS/alumina compound and PS composition of this disclosure comprise HIPS. HIPS refers to any elastomer-reinforced vinylaromatic polymers. The vinylaromatic monomers may include, but are not limited to, styrene, alpha-methylstyrene and ring-substituted styrene. HIPS may further include comonomers, including methylstyrene; halogenated styrenes; alkylated styrenes; acrylonitrile; esters of (meth)acrylic acid with alcohols having from 1 to 8 carbons; N-vinyl compounds such as vinyl-carbazole, maleic anhydride; compounds which contain two polymerizable double bonds such as divinylbenzene or butanediol diacrylate; or combinations thereof. The comonomer may be present in an amount effective to impart one or more user-desired properties to the polystyrene resin. Such effective amounts may be determined by one of ordinary skill in the art with the aid of this disclosure. For example, the comonomer may be present in the styrenic polymer composition in an amount of from 1 wt. % to 99.9 wt. % by total weight of a reaction mixture from which the polystyrene is formed, from 1 wt. % to 90 wt. %, or from 1 wt. % to 50 wt. %.

Within the HIPS, the elastomeric material is typically embedded in the polystyrene matrix. Examples of elastomeric materials include conjugated diene monomers, including, without limitation, 1,3-butadiene, 2-methyl-1,3-butadiene, 2-chloro-1,3 butadiene, 2-methyl-1,3-butadiene, or combinations thereof. In embodiments, the HIPS comprises an aliphatic conjugated diene monomer as the elastomer. Without limitation, examples of suitable aliphatic conjugated diene monomers include C4 to C9 dienes, such as butadiene monomers. Blends or copolymers of the diene monomers may also be utilized. Likewise, mixtures or blends of one or more elastomers may be used to produce the HIPS. In embodiments, the elastomer comprises a homopolymer of a diene monomer; in embodiments, the elastomer comprises polybutadiene. The elastomer may be present in the HIPS in amounts effective to produce one or more user-desired properties. Such effective amounts may be determined by one of ordinary skill in the art with the aid of this disclosure. For example, the elastomer may be present in the HIPS product in an amount of from 1 wt. % to 20 wt. %, from 2 wt. % to 15 wt. %, or from 5 wt. % to 11 wt. %, based on the total weight of the HIPS.

In embodiments, a HIPS utilized in a dried PS/alumina compound or PS composition of this disclosure has a melt flow rate of from 1 g/10 min. to 40 g/10 min., from 1.5 g/10 min. to 20 g/10 min., or from 2 g/10 min. to 15 g/10 min., as determined in accordance with ASTM D-1238; a falling dart impact of from 5 in-lb to 200 in-lb (from 0.6 to 22.6 N-m), from 50 in-lb to 180 in-lb (from 5.6 to 20.3 N-m), or from 100 in-lb to 150 in-lb (from 11.3 to 16.9 N-m), as determined in accordance with ASTM D-3029; an Izod impact of from 0.4 ft-lbs/in to 5 ft-lbs/in (from 0.4 to 267 J/m), from 1 ft-lbs/in to 4 ft-lbs/in (from 53 to 213 J/m), or from 2 ft-lbs/in to 3.5 ft-lbs/in (from 107 to 187 J/m), as determined in accordance with ASTM D-256; a tensile strength of from 2,000 psi to 10,000 psi (from 13.8 to 68.9 MPa), from 2,800 psi to 8,000 psi (from 19.3 to 55.1 MPa), or from 3,000 psi to 5,000 psi (from 20.7 to 34.5 MPa), as determined in accordance with ASTM D-638; a tensile modulus of from 100,000 psi to 400,000 psi (from 0.7 to 2.7 GPa), from 200,000 psi to 400,000 psi (from 1.4 to 2.7 GPa), or from 250,000 psi to 380,000 psi (from 1.7 to 2.6 GPa), as determined in accordance with ASTM D-638; an elongation of from 0.5% to 90%, from 5% to 70%, or from 35% to 60%, as determined in accordance with ASTM D-638; a flexural strength of from 3,000 psi to 15,000 psi (from 20.7 to 103.4 MPa), from 4,000 psi to 10,000 psi (from 27.6 to 68.9 MPa), or from 6,000 psi to 9,000 psi (from 41.4 to 62.1 MPa), as determined in accordance with ASTM D-790; a flexural modulus of from 200,000 psi to 450,000 psi (from 1.4 to 3.1 GPa), from 230,000 psi to 400,000 psi (from 1.6 to 2.8 GPa), or from 250,000 psi to 350,000 psi (from 1.7 to 2.4 GPa), as determined in accordance with ASTM D-790; an annealed heat distortion of from 180° F. to 215° F. (from 82° C. to 102° C.), from 185° F. to 210° F. (from 85° C. to 99° C.), or from 190° F. to 205° F. (from 88° C. to 96° C.), as determined in accordance with ASTM D-648; a Vicat softening of from 195° F. to 225° F. (from 91° C. to 107° C.), from 195° F. to 220° F. (from 91° C. to 104° C.), or from 200° F. to 215° F. (from 93° C. to 102° C.), as determined in accordance with ASTM D-1525; and/or a gloss 60° of from 30 to 100, from 40 to 98, or from 50 to 95, as determined in accordance with ASTM D-523.

The dried PS/alumina compound and PS composition of this disclosure comprise an alumina additive. Any suitable alumina known to those of the art can be utilized as the alumina additive. In embodiments, the alumina additive comprises from about 64 to about 80, from about 72 to about 76, from about 72 to about 74, or greater than or equal to about 70, 72, or 74 wt % aluminum oxide ($Al_2O_3$). In embodiments, the alumina additive comprises less than or equal to about 0.002 wt % sodium oxide ($Na_2O$). In embodiments, a remainder of the alumina composition (i.e., the remainder comprising components other than aluminum oxide or sodium oxide) comprises titania ($TiO_2$), silica ($SiO_2$) and iron oxide (e.g., iron (III) oxide, $Fe_2O_3$). In embodiments, the alumina additive has a d50 particle size (or mass mean diameter), defined as the diameter below which 50% of a sample's mass is comprised that is in a range of from about 5 to about 60, from about 26 to about 60, from about 35 to about 60, or greater than or equal to about 5, 10, 20, 30, 40, 50, or 60 μm. In embodiments, the alumina additive has a surface area, as measured by Brunauer-Emmett-Teller (BET) technique, that is in a range of from about 80 to about 360 $m^2/g$, from about 35 to about 400 $m^2/g$, from about 150 to about 360 $m^2/g$, from about 200 to about 360 $m^2/g$, or greater than or equal to about 35, 80, 100, 150, or 230 $m^2/g$. In embodiments, the alumina additive has a pore volume that is in a range of from about 0.3 to about 1.5 mL/g, from about 0.5 to about 1.3 mL/g, or from about 0.5 to about 1.0, mL/g. In embodiments, the alumina additive has a 120 crystallite size, as measured by x-ray diffraction at the (120) diffraction peak, that is in a range of from about 4 to about 50 nm, from about 4.5 to about 20 nm, or from about 5.5 to about 10 nm. In embodiments, the alumina additive comprises CATAPAL®, available from Sasol, PURAL®, available from Sasol, or a combination thereof. For example, in embodiments, the alumina additive comprises CATAPAL® A, CATAPAL® B, CATAPAL® C1, CATAPAL® D, CATAPAL® 200, PURAL® SB, PURAL® SCF, PURAL® 200, PURAL® BT, or a combination thereof. Table 1 shows exemplary alumina additives that can be utilized in the PS/alumina compound (e.g., the PS/alumina compound from which moisture is removed to form the dried PS/alumina compound) of this disclosure. This tabulation is not exhaustive, and any suitable alumina additive as described herein or known to those of skill in the art and with the help of this disclosure can be utilized, in embodiments. Without wishing to be limited by theory, the alumina additive can serve as an infrared (IR) attenuator, in embodiments.

TABLE 1

Suitable Alumina Additives for Use in PS/Alumina Compound of this Disclosure

| Typical Physical & Chemical Properties | CATAPAL® A | CATAPAL® B | PURAL® SB | PURAL® SCF | CATAPAL® C1 | CATAPAL® D | PURAL® 200 & CATAPAL® 200 | PURAL® BT |
|---|---|---|---|---|---|---|---|---|
| $Al_2O_3$ (%) | 72 | 72 | 74 | 74 | 72 | 76 | 80 | 64 |
| $Na_2O$ (%) | 0.002 | 0.002 | 0.002 | 0.002 | 0.002 | 0.002 | 0.002 | 0.002 |
| Loose Bulk Density (g/L) | 670-750 | 670-750 | 600-850 | 500-700 | 670-750 | 700-800 | 500-700 | 500-700 |
| Packed Bulk Density (g/L) | 800-1100 | 800-1100 | 800-1100 | 800-1100 | 800-1100 | 800-1100 | 700-900 | 600-800 |
| Particle Size, $d_{50}$ (μm) | 60 | 60 | 45 | 25 | 60 | 40 | 40 | 5-10 |

TABLE 1-continued

Suitable Alumina Additives for Use in PS/Alumina Compound of this Disclosure

| Typical Physical & Chemical Properties | CATAPAL ® A | CATAPAL ® B | PURAL ® SB | PURAL ® SCF | CATAPAL ® C1 | CATAPAL ® D | PURAL ® 200 & CATAPAL ® 200 | PURAL ® BT |
|---|---|---|---|---|---|---|---|---|
| BET Surface Area** ($m^2/g$) | 250 | 250 | 250 | 250 | 230 | 220 | 100 | 360 |
| Pore Volume*** (mL/g) | 0.45 | 0.50 | 0.50 | 0.50 | 0.50 | 0.55 | 0.77 | 0.30 |
| Crystallite Size, 120 (nm) | 4.5 | 4.5 | 5.0 | 5.0 | 5.5 | 7.0 | 40 | 40 |

**Specific surface area measured by Brunauer-Emmett-Teller theory.
***The ratio of a porous material's air volume to a porous materials total weight.

In embodiments, the dried PS/alumina compound comprises from about 0.01 to about 20.0 weight percent (wt %), from about 0.1 to about 10 wt %, from about 0.2 to about 1 wt %, less than or equal to about 10, 7, or 5 wt %, or greater than or equal to about 0.1, 0.2, or 0.5 wt % of the alumina additive.

As noted above, a PS composition of this disclosure can further include one or more additional additives. In embodiments, the PS composition (e.g., the PS/alumina compound from which moisture is removed to form the dried PS/alumina compound, the dried PS/alumina compound utilized to form the PS composition, and/or the PS composition) comprises low levels of one or more solubility and/or retention additives or SRA's, as described in U.S. patent application Ser. No. 16/014,883, the disclosure of which is hereby incorporated herein by reference in its entirety for purposes not contrary to this disclosure. In embodiments, the SRA can comprise epoxidized soy oil (ESO), epoxidized polybutadiene, mineral oil (MO), glycerol monostearate (GMS), glycerol tri-stearate (GTS), IRGANOX 1010® (pentaerythritol tetrakis(3-(3,5-di-tert-butyl-4-hydroxyphenyl)propionate), or a combination thereof. Without wishing to be bound by theory, it is postulated that the presence of the SRA(s) may further increase the solubility of the blowing agent, thereby improving miscibility in PS (e.g., molten PS, such as during extrusion), and that the presence of the SRA may reduce the activation energy for the nucleation of bubbles and cell growth due to increased mobility of the polymer chains due to a plasticizing effect. This may result in the production of a large number of cells, thereby yielding lower foam densities, in embodiments.

In embodiments, the PS composition can comprise from about 0.01 to 10.0 weight percent (wt %), from about 0.01 to 5.0 wt %, from about 0.01 to 2.0 wt %, from about 0.1 to 1.0 wt %, or from about 0.01 to 0.50 wt % of the SRA(s), the weight percentages being based on the total weight of the PS composition. In embodiments, the dried PS/alumina composition comprises about 0.01, 0.05, 0.1, 0.25, 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, or 5.0 wt % of the SRA(s), based on the total weight of the dried PS/alumina composition.

In embodiments, the dried PS/alumina compound and/or the PS composition of this disclosure comprises low levels of mineral oil (MO) and/or epoxidized soybean oil (ESO) as SRA(s). Without wishing to be limited by theory, it is speculated that MO and ESO can plasticize PS melt to a certain degree, effectively improving "free volume" by increasing the mobility of the polymer chain segments. The polar species of the ESO may expedite the diffusivity of polar blowing agent molecules throughout a PS melt. The addition of ESO to PS to produce a PS composition of this disclosure may thus allow PS to be foamed at relatively low temperatures with high blowing agent concentrations, in embodiments. As the presence of MO and/or ESO may detrimentally affect foam mechanical properties, such as melt strength of polystyrene, which could, if significant, result in undesirable collapsed cells, PS compositions comprising such SRA(s) may be fine-tuned to achieve an optimal balance of blowing agent solubility improvement and melt strength. For example, in embodiments, strengtheners, such as, without limitation, high stiffness poly(phenylene oxide) (PPO), polyalphamethyl styrene, or combinations may be added to the PS composition (e.g., incorporated into the PS/alumina compound, incorporated into the dried PS/alumina compound, and/or combined with the dried PS/alumina compound to form the PS composition) to achieve a desired foam compression strength.

Although described with reference to an epoxidized soybean oil, in embodiments, an SRA of this disclosure may comprise any of a wide variety of epoxidized fatty acids and esters. For example, in embodiments, the epoxidized fatty acid can comprise: myristic acid, myristoleic acid, palmitic acid, palmitoleic acid, margaric acid, margaroleic acid, stearic acid, oleic acid, linoleic acid, linolenic acid, arachidic acid, gadoleic acid, eicosadienoic acid, behenic acid, erucic acid, lignoceric acid or a combination thereof. Such fatty acids can be found in a variety of vegetable oils including, but not limited to, linseed oil, tung oil, safflower oil, soybean oil, castor oil, cottonseed oil, peanut oil, rapeseed oil, coconut oil, palm oil, olive oil, corn oil, corn germ oil, sesame oil, peach seed oil, peanut oil, soybean lecithin, and egg yolk lecithin. Thus, a variety of epoxidized fatty acids can be used in a PS composition according to this disclosure. In embodiments, the SRA comprises an acrylated epoxidized fatty acid, as described, for example, in U.S. Pat. No. 8,648,122, the disclosure of which is hereby incorporated herein in its entirety for purposes not contrary to this disclosure.

In embodiments, the SRA comprises mineral oil (MO). As utilized herein, MO can be any light mixture of alkanes from a mineral source, for example, a distillate of petroleum, and includes mixtures of mineral oil from different sources or processes. The MO may be a liquid by-product of the refining of crude oil, for example.

In embodiments, the SRA comprises epoxidized polybutadiene. The epoxidized polybutadiene comprises epoxy groups (or 'oxirane oxygen' groups) on the polymer backbone. In embodiments, the epoxidized polybutadiene can comprise from about 0.01% to about 5.0%, from about 0.01% to about 2.0%, or from about 0.01% to about 1.0% percent oxirane oxygen. In embodiments, the epoxidized polybutadiene can have an epoxy value, as measured by ASTM D1652, in the range of from about 0.1 to about 5.0 meq/g, from about 0.5 to about 3.0 meq/g, or from about 1.0 to about 2.0 meq/g. In embodiments, the molecular weight of epoxidized polybutadiene ranges from 800 to 10,000.

In embodiments, the SRA comprises glycerol monostearate (GMS). In embodiments, a PS composition of this disclosure comprises glycerol tristearate (GTS), which is more bulky than GMS, and may, in embodiments, impart particularly beneficial properties to PS foams.

In embodiments, the SRA(s) further enhance blowing agent solubility in PS for foam extrusion. In embodiments, the SRA(s) enhance the solubility of the blowing agent in the foamable mixture by at least 5, 7, 10, or 20% over the solubility of the blowing agent in a foamable mixture absent the additive.

Without wishing to be limited by theory, the SRA(s) may serve as a permeation barrier within the resulting polystyrene foam of this disclosure, thus reducing the permeation rate of blowing agent through the cell walls of the PS foam.

In embodiments, the PS of a PS composition of this disclosure further comprises one or more additional additives employed to impart desired physical properties, such as, increased gloss or color, etc. Examples of such additives include, without limitation, stabilizers, talc, antioxidants, UV stabilizers, lubricants, plasticizers, ultraviolet screening agents, oxidants, anti-oxidants, anti-static agents, ultraviolet light absorbents, fire retardants, processing oils, mold release agents, coloring agents, pigments/dyes, fillers, and the like. The aforementioned additives may have been used either singularly or in combination to form the PS, the PS/alumina compound, and/or the dried PS/alumina compound of the PS composition or may be added to a PS composition of this disclosure separately from the PS or the dried PS/alumina compound of the PS composition. For example, stabilizers or stabilization agents may have been employed to help protect the polymeric composition from degradation due to exposure to excessive temperatures and/or ultraviolet light during formation of the PS. The additives may have been added after recovery of the PS, for example during compounding such as pelletization. These additives may be included in amounts effective to impart the desired properties. Effective additive amounts and processes for inclusion of these additives to polymeric compositions to produce a PS for use in a PS composition of this disclosure are known to one skilled in the art. For example, the additives may be present in the PS or PS composition in an amount of from 0.1 wt. % to 5 wt. %, alternatively from 0.1 wt. % to 2 wt. %, or alternatively from 0.1 wt. % to 1.0 wt. % based on the total weight of the PS composition or a polymeric composition from which the PS of the PS composition of this disclosure is produced, respectively.

As noted above, various additional additives can be included within the PS composition. In embodiments, a PS composition of this disclosure further comprises an additive in addition to the SRA(s) and the PS (i.e., in addition to any additives utilized during formation of the polystyrene and introduced separately from the polystyrene and the SRA(s)). In embodiments, for example, it can be desirable to include a foaming nucleating agent (e.g., a chemical blowing agent as foaming nucleators, zinc oxide, zirconium oxide, silica, talc, and the like) and/or an aging modifier (e.g., a fatty acid ester, a fatty acid amide, a hydroxyl amide, and the like). Other additives that can be employed include pigments, colorants, fillers, stability control agents, antioxidants, flame retardants, stabilizers or costabilizers (e.g. thioethers, phosphites, phosphonites, light stabilizers and other functional stabilizers), fragrances, odor masking agents, antistatic agents, lubricants, foaming aids, coloring agents, deterioration inhibitors, and the like. Such additives are well known to those of ordinary skill in the art. In embodiments, a PS composition of this disclosure comprises an additive (in addition to any additives in the PS and any SRA(s)) selected from the group consisting of antioxidants, flame retardants, infrared (IR) attenuators foaming nucleators, and combinations thereof. In embodiments, a PS composition of this disclosure comprises the antioxidant IRGANOX® 1010 (pentaerythritol tetrakis(3-(3,5-di-tert-butyl-4-hydroxyphenyl)propionate)). As noted above, in embodiments, one or more additional additives, such as, without limitation, strengtheners (e.g., PPO, polyalphamethyl styrene, etc.) are employed to improve foam mechanical properties. The additives can also be used in the form of masterbatches, in embodiments. As utilized herein, a "masterbatch" is a concentrated formulation of the additive(s).

A PS composition of this disclosure can further comprise a blowing agent. In embodiments, any chemical or physical blowing agent can be used. Chemical foaming agents typically decompose at polymer melting conditions. For example, a sodium bicarbonate and citric acid mixture is commonly used to nucleate fine cells. Chemical foaming agents typically decompose between about 100° C. to about 140° C. to yield at least one gas, such as carbon dioxide, and water. In addition, solid particles can potentially act as nucleation sites. Once the nucleated bubble reaches a critical size, it grows continuously due to gas diffusion inside the cells until the bubble stabilizes to reach the final stage. Suitable chemical blowing agents are known to those of skill in the art. In embodiments, the blowing agent can be a physical blowing agent. Physical blowing agents can be further classified into two categories, including gases and volatile liquids. Gaseous physical blowing agents can include, but are not limited to, carbon dioxide ($CO_2$), nitrogen ($N_2$), argon (Ar), air, helium (He), hydrogen ($H_2$), xenon (Xe), sulfur hexafluoride ($SF_6$), nitrous oxide ($N_2O$), ammonia ($NH_3$), silicon tetrafluoride ($SiF_4$), nitrogen tetrafluoride ($N_2F_4$), boron tetrafluoride ($BF_4$), boron trichloride ($BCl_3$), or combinations thereof. Thus, in embodiments, the blowing agent can be carbon dioxide ($CO_2$). Volatile liquid physical blowing agents can include, but are not limited to, liquids, such as water, and aliphatic or linear hydrocarbons.

In embodiments, a single blowing agent or class thereof (e.g., an HFC, an HFO, multiple HFCs, multiple HFOs) are utilized. In embodiments, multiple blowing agents are utilized (e.g., one or more HFOs and/or one or more HFCs, optionally in combination with one or more additional blowing agents). In embodiments, the blowing agent is selected from the group consisting of hydrofluorocarbons (HFCs), hydrofluoroolefins (HFOs), and combinations thereof. In embodiments, the blowing agent or the one or more additional blowing agents further comprise one or more component selected from the group consisting of hydrocarbons, carbon dioxide, nitrogen, and combinations thereof. By way of example, in embodiments, the blowing agent comprises one or more HFOs, optionally in combination with one or more additional blowing agents selected from the group consisting of hydrocarbons, carbon dioxide, nitrogen, HFCs, and combinations thereof. By way of alternative example, in embodiments, the blowing agent comprises one or more HFCs, optionally in combination with one or more additional blowing agents selected from the group consisting of hydrocarbons, carbon dioxide, nitrogen, HFOs, and combinations thereof.

In embodiments, utilization of the dried PS/alumina compound of this disclosure in the PS composition increases the solubility of the blowing agent in the PS composition or foamable mixture such that the solubility therein is at least 5, 10, 15, or 20% greater than the solubility of the blowing agent in an otherwise similar PS composition or foamable mixture produced without the dried PS/alumina compound (that is, PS is present in about equal amount, but without alumina being present).

The disclosed PS composition can have a wet density, as measured by ASTM C578, of less than or equal to about 0.09 g/mL (5.6 pounds per cubic foot ("pcf")). In embodiments, the disclosed PS composition can have a wet density ranging from about 0.03 to about 0.09 g/mL (from about 1.9 to about 5.6 pcf), from about 0.03 to about 0.085 g/mL (from about 1.9 to about 5.5 pcf), from about 0.03 to about 0.08 g/mL (from about 1.9 to about 5.0 pcf).

Also disclosed herein is a low density polystyrene (PS) foam produced via extrusion of a PS composition of this disclosure. In embodiments, the low density polystyrene (PS) foam produced via extrusion of the PS composition of this disclosure contains a higher blowing agent concentration than that of an otherwise similar low density PS foam produced via extrusion of a PS composition that does not contain (e.g., was not produced with) the dried PS/alumina compound (that is, PS is present in about equal amount, but without alumina being present). For example, in embodiments, the blowing agent solubility in the PS composition utilized to make the foam and/or a blowing agent concentration in the low density PS foam produced via extrusion of the PS composition of this disclosure is greater than or equal to about 6.5, 7, 7.5 or 8 weight percent.

In embodiments, the low density PS foam exhibits at least one at least comparable or at least one superior insulative property relative to that of an otherwise similar low density foam produced via extrusion of a PS composition that does not contain (e.g., was not produced with) the dried PS/alumina compound (that is, PS is present in about equal amount, but without alumina being present). The at least one superior insulative property can comprise an R-value, as determined by ASTM C518. In embodiments, the low density PS foam exhibits at least one mechanical property that is at least comparable to that of an otherwise similar low density foam produced via extrusion of a PS composition that does not contain (e.g., was not produced with) the dried PS/alumina compound (that is, PS is present in about equal amount, but without alumina being present). In embodiments, the at least one mechanical property can be the compressive strength (as measured by ASTM D3574-C). In embodiments, a low density polystyrene (PS) foam produced via extrusion of a PS composition of this disclosure comprising a blowing agent comprising one or more hydrofluoroolefins exhibits at least one insulative property that is at least equivalent to that of an otherwise similar low density foam produced via extrusion of a PS composition that does not contain (e.g., was not produced with) the dried PS/alumina compound (that is, PS is present in about equal amount, but without alumina being present) and comprises one or more blowing agents selected from the group consisting of hydrofluorocarbons (HFCs).

In embodiments, a low density PS foam produced from a PS composition comprising the dried PS/alumina compound as described herein and a blowing agent comprising one or more hydrofluorocarbons (HFCs) or one or more hydrofluoroolefins (HFOs) comprises a higher concentration of the blowing agent relative to that of an otherwise similar low density PS foam produced via extrusion of a PS composition that does not contain the dried PS/alumina compound (that is, PS is present in about equal amount, but without alumina being present). Such a low density PS foam can be produced from a PS composition further comprising an additional blowing agent. For example, the additional blowing agent can be selected from the group consisting of hydrocarbons, $CO_2$, $N_2$, and combinations thereof.

Without wishing to be limited by theory, the PS/alumina compound and/or any optional SRA additive(s) may provide a permeation barrier within the resulting polystyrene foam of this disclosure, thus reducing the permeation rate of blowing agent through the cell walls of the PS foam. The (e.g., low density) polystyrene foam of this disclosure may thus exhibit an increased retention of the blowing agent subsequent formation of the foam, for example, after a time of 15, 30, or 60 days. In embodiments, the low density polystyrene foam of this disclosure exhibits a blowing agent retention, as determined, for example, by GC headspace technique, that is at least 0, 5, 10, 15, or 20% greater than that of an otherwise similar polystyrene foam produced in the absence of the PS/alumina compound and/or the optional SRA additive(s) (that is, PS is present in about equal amount, but without alumina and/or the optional SRA additive(s) being present).

The disclosed low density polystyrene foam can have any desired thickness to suit an intended application. For example, in embodiments, the disclosed polystyrene foam can be in the form of a sheet or plank having a thickness ranging from about 1/32 inch to about 2.0 inches. However, thinner or thicker foams are also included within the scope of the herein-disclosed subject matter. The low density polystyrene foam can have any desired density, such as, but not limited to, a wet density, as measured by ASTM C578, of less than or equal to about 0.09 g/mL (5.6 pounds per cubic foot ('pcf')). In embodiments, the low density polystyrene foam can have a wet density ranging from about 0.02 to about 0.09 g/mL, from about 0.03 to about 0.08 g/mL, from about 0.04 to about 0.08 g/mL, or from about 0.04 to about 0.06 g/mL.

In embodiments, the disclosed polystyrene foam can have an average cell size of at least about 50 microns. In embodiments, the disclosed polystyrene foam can have an average cell size of at most about 1000 microns. The average cell size can be measured in accordance with ASTM D3576-98 (Procedure A).

The disclosed polystyrene foam can take any of a wide variety of configurations, such as, but not limited to, sheets, plank, slabs, blocks, boards, rods, beads, and molded shapes.

A method of making a PS foam according to this disclosure comprises forming the dried PS/alumina compound; blending the dried PS/alumina compound, a blowing agent, and optionally one or more additional additives to form a foamable mixture; and producing the PS foam by extruding the foamable mixture through a die and into a region of reduced pressure. According to this disclosure, the PS/alumina compound has to be fully dried (i.e., have a moisture content, as measured by a Coulometer, that is less than or equal to about 0.05 wt % moisture) to form the dried PS/alumina compound prior to extrusion foaming. According to this disclosure, moisture absorption is minimized during foam extrusion. Forming the dried PS/alumina compound can comprise combining the PS and the alumina additive to form a PS/alumina compound, and, if necessary, removing moisture from the PS/alumina compound, to form the dried PS/alumina compound, wherein the dried PS/alumina compound has a moisture content, measured by a Coulometer, that is less than or equal to about 0.05 weight percent (wt %). In embodiments, combination of the PS and the alumina additive results in the dried PS/alumina compound, i.e., the PS and the alumina additive are of sufficient dryness prior to combination such that combination thereof (without further moisture removal) results in a PS/alumina compound having the required moisture content (e.g., less than or equal to about 0.05 weight percent (wt %), as measured by a Coulometer), such that the PS/alumina compound is considered a dried PS/alumina compound.

To form the PS/alumina compound, the PS and the alumina additive can be combined in any suitable manner known to those of skill in the art. For example, in embodiments, the PS and the alumina additive are combined by extrusion to provide the PS/alumina compound. The alumina additive and/or the PS can optionally be dried prior to combination of the alumina additive with the PS. For example, in embodiments, the alumina additive can be dried by heating the alumina additive to an elevated temperature (e.g., of greater than or equal to about 120° C., 200° C., or 250° C.), and/or maintaining the temperature at the elevated temperature for a time period (e.g., a time period of greater than or equal to about 2, 3, or 4 h) sufficient to reduce a moisture content of the alumina additive, for example, to a moisture content, as measured by a Coulometer, of less than or equal to about 0.05, 0.03, or 0 weight percent (wt %).

Removing moisture from the PS/alumina compound to form the dried PS/alumina compound can be effected by any means known to those of skill in the art and with the help of this disclosure to be suitable for reducing the moisture content of the PS/alumina compound to provide the dried PS/alumina compound having the moisture content, as measured a Coulometer of less than or equal to about 0.05 weight percent (wt %). For example, removing moisture can comprise heating the PS/alumina compound to an elevated temperature (e.g., of greater than or equal to about 50, 60, 70, or 80° C.), and/or maintaining the temperature at the elevated temperature for a time period (e.g., a time period of greater than or equal to about 1, 2, 3, 4, 5, 6, 7, 8, 9, 10, 11, or 12 h) sufficient to provide the dried PS/alumina compound.

The disclosed polystyrene foam can be constructed from the dried PS/alumina compound using any of the processes known in the art. For example, in embodiments, the PS foam is produced by blending the dried PS/alumina compound, a blowing agent, and optionally one or more additional additives (e.g., such blowing agent and additives described hereinabove) to form a foamable mixture; and producing a foam by extruding the foamable mixture through a die and into a region of reduced pressure.

In embodiments, any chemical or physical blowing agent, as described above, can be utilized. As will be apparent to those having ordinary skill in the art, blowing agents work by expanding a thermoplastic resin to produce a cellular thermoplastic structure having substantially less density than the resin from which the foam is made. Bubbles of gas form around 'nucleation sites' and are expanded by heat or reduced pressure or by a process of chemical reaction in which a gas is evolved. A nucleation site is a small particle or conglomerate of small particles that promotes the formation of a gas bubble in the resin. In embodiments, one or more additives can be incorporated into the resin to promote nucleation for a particular blowing agent and thereby provide for a more uniform pore distribution. In embodiments, the alumina serves as foaming nucleator of the PS composition of this disclosure, and no additional nucleator is utilized to form a low density PS foam of this disclosure.

The total amount of blowing agent in the PS composition used to prepare the disclosed PS foam structures depends on conditions such as the temperature and pressure under which the blowing agent is dissolved in the polymer, the chemical and thermophysical characteristics of the blowing agent used, and the desired density and associated properties (such as insulation value, weight-to-strength ratio, compressive strength, etc.) of the resulting foamed article. Thus, in embodiments, the blowing agent can be mixed with the dried PS/alumina compound in an amount suitable to achieve a desired degree of expansion in the resultant PS foam. For example, in embodiments, the blowing agent can be added to the dried PS/alumina compound in an amount ranging from about 0.5 to about 15 parts by weight; in embodiments, from about 2 to 10 parts by weight; and in embodiments, from about 3 to 9 parts by weight, based on 100 parts by weight of the PS composition or foamable mixture.

In embodiments, the disclosed polystyrene foam can be constructed using a continuous extrusion process. In this method the dried PS/alumina compound and any additional additives are blended together and added to an extruder. In embodiments, the one or more additional additives can be added in a masterbatch form. Any conventional type of extruder can be used, e.g., single screw, double screw, and/or tandem extruders. In the extruder, the dried PA/alumina compound and any additional additives are melted and mixed to provide a PS/alumina blend. The blowing agent is added to the melted PS/alumina blend through one or more injection ports in the extruder. Any additional additives that are to be used can be added to the melted PS/alumina blend in the extruder and/or can be added with the PS resin pellets and/or the dried PS/alumina compound, as noted hereinabove. The extruder pushes the entire melt mixture (melted PS/alumina blend, blowing agent, and any additional additives) through a die at the end of the extruder and into a region of reduced temperature and pressure relative to the temperature and pressure within the extruder. Any of a wide variety of dies can be used, including, but not limited to, strand, annular, flat, coextruded, and microlayered dies. In embodiments, the region of reduced temperature and pressure can be at ambient atmosphere. The sudden pressure drop due to polymer filled with gas as it exits the die results in thermodynamic instability. The nucleating agents (e.g., alumina) generate a large number of bubbles and grow due to the diffusion of vaporized gas into growing cells. The foam continues to expand until the cells grow and stabilize. The foam surface solidifies upon cooling of the polymer mass, due to the reduction in temperature, thereby trapping the blowing agent within the cells. An extruded polystyrene foam is thereby formed.

Alternatively, in embodiments, the disclosed polystyrene foam can be constructed using a batch process. In such embodiments, the polystyrene blend (i.e., dried PS/alumina compound and any desired additional additives) is added to a container, such as a pressure chamber. The container is heated to a specified temperature or temperature range sufficient to plasticize the polystyrene resin. The blowing agent is then added into the container to a specified pressure or pressure range, allowing the blowing agent to penetrate the polystyrene resin over a period of time. The pressure is rapidly relieved, thereby allowing the resin to expand into a PS foam.

The presently disclosed subject matter also includes additional methods of foaming, including, but not limited to, solid state foaming, integral skin foaming, microcellular foaming, autoclave foaming, and semi-continuous foaming processes. Such methods are well known to those of ordinary skill in the foaming art. In embodiments, the optional additional additives (e.g., SRAs, flame retardants, IR attenuators/inhibitors, antioxidants, and/or etc.) may be added as masterbatches into otherwise conventional polystyrene formulations.

As set forth herein, the presently disclosed methods can be used to construct a polystyrene foam using a physical blowing agent (e.g., one or more HFOs, one or more HFCs, carbon dioxide, and/or etc.). Depending on the materials and process used, the resulting foam article can be a bead, sheet, board, plank, rods, tubes, contoured members, or the like. The disclosed polystyrene foam can be used as such, cut into other shapes, further shaped or thermoformed by application of heat and/or pressure, or otherwise machined or formed into articles of desired size and shape, as would be well known to those of ordinary skill in the packaging art.

The disclosed polystyrene foams can be used for any of a wide variety of purposes. For example, in embodiments, the disclosed polystyrene foam can be used for insulation, in various container and packaging systems, and/or as protective or flexible packaging. Thus, in embodiments, the disclosed polystyrene foam can be thermoformed into containers, such as, but not limited to, trays, bowls, and/or plates, used in flexible and rigid packaging, used in a variety of protective packaging applications, used in loose fill packaging, and/or can be molded as sheets, planks, boards, or contoured articles for flexible, protective, rigid, and/or insulative applications.

As noted hereinabove, the herein-disclosed PS composition and method of producing a PS foam therefrom may enable greater solubility of blowing agent(s) in PS during extrusion and/or a higher concentration of blowing agent(s) in the resulting PS foam. The incorporation of a greater concentration of blowing agent(s) in the resultant polystyrene foam may provide for enhanced insulative properties thereof.

Additionally, it has been found that when a dried PS/alumina compound is utilized to form the PS composition according to this disclosure, the PS composition can be foamed in the presence of a physical blowing agent, such as carbon dioxide and/or HFOs. In embodiments, the non-flammability and/or low GWP of the blowing agent allows for improved safety and/or environmental friendliness relative to conventional flammable or high GWP hydrocarbons. The use of a physical blowing agent may also help to reduce the curing time of the foam, which may save time, effort, and money.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

In this Example, three PS foams were produced and studied, including a first comparative foam, C1, produced utilizing a PS composition comprising standard polystyrene PS533 and no alumina additive, a second comparative foam, C2, produced utilizing a PS composition comprising a wet PS/alumina compound comprising the PS PS533 and 1 wt % alumina additive and water, and an inventive PS foam, I1, produced utilizing a dried PS/alumina compound comprising the PS PS533 and 1 wt % alumina additive, and dried to contain substantially no moisture, e.g., by drying in a nitrogen purge oven at 250° C. for about 2 hours. The alumina additive used in this Example was Sasol CATAPAL® C1, relevant properties of which are provided in Table 1 hereinabove, including a particle size, d50, of 60 microns.

Specifically, first comparative foam C1 was a standard foam produced from polystyrene PS533 dry blended with 0.5% of a talc masterbatch for foam extrusion. PS533 has a MFR of 4.5 g/10-min, and is available from Total Petrochemicals and Refining USA, Inc. A large PS/alumina compound comprising PS533 and 1 wt % dried alumina additive was produced on a 1.25" single screw extruder. The PS/alumina compound was dried and then divided in two. Drying comprised drying in a nitrogen purge oven at 250° C. for about 2 hours. The first half of the dried PS/alumina compound was used directly for foam extrusion to form inventive foam I1. An amount of 0.75 wt % of dionized water was added to the other half of the PS/alumina compound, which was then left overnight to allow for sufficient moisture absorption prior to foam extrusion to form second comparative foam C2.

The foam extrusions were evaluated on the Applications Laboratory Davis Standard foam line. As mentioned above, comparative foam C1 was formed from the PS533 dry blended with 0.5% talc masterbatch as nucleators for the foam extrusion. The alumina additives acted as foaming nucleators in the PS/alumina compounds utilized to form second comparative foam C2 and inventive foam I1, thus, no additional nucleator was added to the PS compositions utilized to form second comparative foam C2 and inventive foam I1.

The PS compositions were evaluated for foam extrusion utilizing varying amounts of HFC 134a (also referred to as R134a) as the blowing agent. The PS compositions were foamed in a tandem foam extrusion line comprising a 0.75" primary extruder and a 1.5" secondary extruder. Specifically, the samples were placed in the hopper of the primary extruder. The blowing agent HFC 134a was fed into the primary extruder through a MaxPro liquid pump. The homogenized melt was fed into the secondary extruder through a Nordson Xaloy melt pump. The secondary extruder temperatures were adjusted to maintain a constant die head pressure of 1100-1200 psi at different HFC 134a blowing agent levels. As the melt exited the die, low density foams were produced. A 5 mm rod die was used for extrusion of all samples. A gear pump was used to control the extrusion throughput between 6.5 and 7 lbs/hr. The maximum HFC 134a solubility was defined as the blowing agent level at which premature foaming became visible (e.g., and foam density increased).

First Comparative Example C1

Figure 1B:
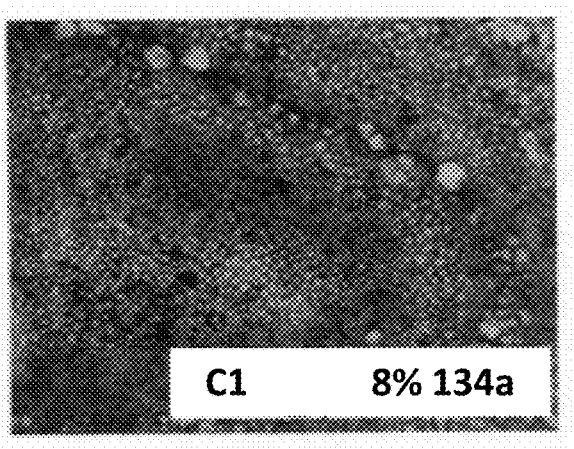

The PS foams C1 produced utilizing standard PS533 polystyrene produced foams having consistent cell structures at lower than 7% of blowing agent HFC 134a. However, at higher HFC 134a blowing agent levels, premature foaming became significant, very likely before the breaker plate near the die head, resulting in foam defects with inconsistent foam cell structures. Under the foaming conditions established on the small lab line, the maximum HFC 134a blowing agent solubility for PS compositions comprising standard PS533 and no alumina additive was determined to be around 7 wt % HFC 134a. FIG. 1A provides an image of a first comparative foam sample C1 of this Example comprising 7 wt % of the blowing agent HFC 134a, and FIG. 1B provides an image of a first comparative foam sample C1 of this Example comprising 8 wt % of the blowing agent HFC 134a.

Second Comparative Example

Figure 2A:
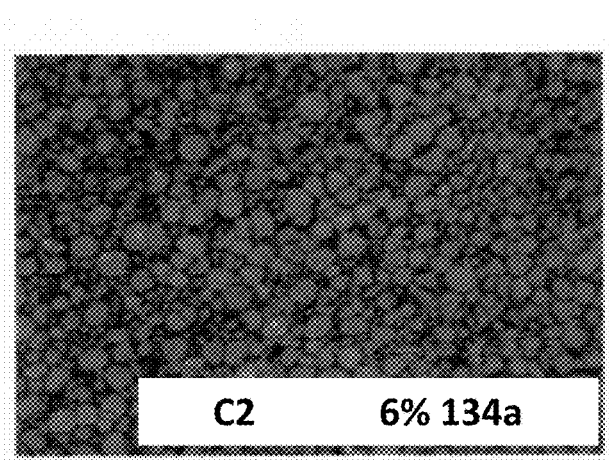
Figure 2B:
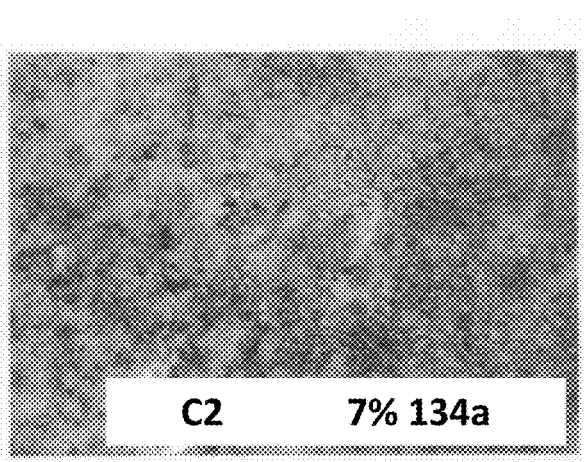

The wet PS533/alumina compound was investigated for foam extrusion under the standard conditions. Similar to what was seen for first comparative foam C1, second comparative foams C2 having consistent cell structures were produced when the HFC 134a blowing agent concentration was lower than 7 wt %. Due to the presence of abundant moisture, bi-cellular foams were likely produced. However, at HFC 134a concentrations of 7 wt % or higher, premature foaming significantly compromised the quality of the resulting second comparative C2 foams. Moisture was thus not an effective plasticizer for crystal PS, and did not provide a benefit at high HFC 134a levels, relative to the alumina-free first comparative C1 foams. Overall, the maximum HFC 134a solubility in the wet PS/alumina compound utilized to produce second comparative foams C2 was at most 7%, similar to that seen for the first comparative C1 foams. FIG. 2A provides an image of a second comparative foam sample C2 of this Example comprising 6 wt % of the blowing agent HFC 134a, and FIG. 2B provides an image of a second comparative foam sample C2 of this Example comprising 7 wt % of the blowing agent HFC 134a.

Inventive Example

The dried PS533/alumina compound was investigated for foam extrusion under the standard conditions to produce inventive foams I1. Similar to the standard PS533 utilized to produce first comparative foams C1 and the wet PS/alumina compound utilized to produce second comparative foams C2, very good foams (e.g., foams having consistent cell structure) were produced utilizing the dried PS/alumina compound when the HFC 134a blowing agent concentration was lower than 7 wt %. Successful I1 foams were also produced at HFC 134a levels greater than 8.5 wt %.

Figure 5:
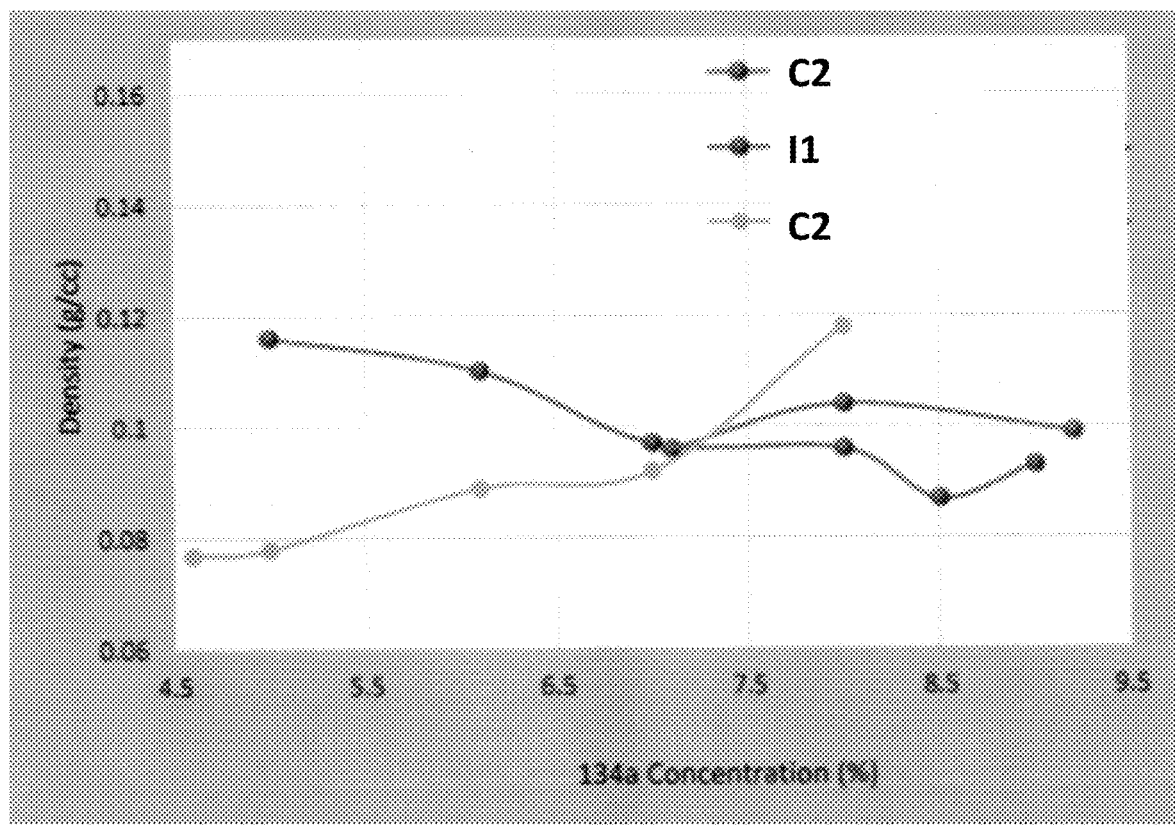
FIG. 5 is a plot of wet density (g/cc) as a function of the concentration (wt %) of blowing agent HFC 134a for compositions of Example 1.

FIG. 3A provides an image of an inventive foam sample I1 of this Example comprising 6 wt % of the blowing agent HFC 134a, FIG. 3B provides an image of an inventive foam sample I1 of this Example comprising 7 wt % of the blowing agent HFC 134a, and FIG. 3C provides an image of an inventive foam sample I1 of this Example comprising 8.5 wt % of the blowing agent HFC 134a. As seen in FIGS. 3A-3C, expanded foams having consistent cell structure were obtained from the dry PS533/alumina compound even at 9 wt % of blowing agent HFC 134a, showing an improvement over the second comparative foams C2 obtained utilizing the wet PS533/alumina compound at 7.5% 134a. It is also noted that relatively lower foam densities (e.g., of inventive I1 foams) were produced from the dry PS533/alumina compound at higher HFC 134a levels. Based on the established protocol, the maximum HFC 134a solubility in the dry PS533/alumina compound appeared to be about 9 wt %. FIG. 4 shows a side by side comparison of second comparative foam samples C2 at 7 wt % and 7.5 wt % HFC 134a blowing agent and inventive foam samples I1 at 9 wt % HFC 134a blowing agent. FIG. 5 is a plot of wet density (g/cc) as a function of the concentration (wt %) of blowing agent HFC 134a for first comparative foams C1, second comparative foams C2, and inventive foams I1 of this Example. The wet densities were determined by ASTM C578. Overall, utilization of the pre-dried PS533/1 wt % alumina compound in the PS composition significantly improved the solubility of the HFC 134a blowing agent. The porosity of the dried alumina additive was expected to facilitate increased absorption of the HFC 134a blowing agent in the PS compound. It was interesting to find that, although only 1% alumina was utilized in this Example, the pre-dried PS/alumina compound could be processed at a maximum HFC 134a blowing agent concentration of greater than 9 wt %. This is equivalent to a greater than 20% increase in blowing agent solubility in the PS composition comprising the dried PS/alumina compound utilized to produce the inventive foam I1 over the standard PS composition comprising PS 533 and no alumina additive utilized to produce first comparative foams C1. Additional alumina can be utilized to further improve the solubility of the HFC 134a blowing agent in the PS composition utilized to produce a PS foam, and thus a blowing agent concentration in the resulting PS foam.

While various embodiments have been shown and described, modifications thereof can be made by one skilled in the art without departing from the spirit and teachings of the disclosure. The embodiments described herein are exemplary only, and are not intended to be limiting. Many variations and modifications of the subject matter disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$ and an upper limit, $R_U$ is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural, or other details supplementary to those set forth herein.

Additional Description

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Alternative embodiments that result from combining, integrating, and/or omitting features of the embodiment(s) are also within the scope of the disclosure. While compositions and methods are described in broader terms of "having", "comprising," "containing," or "including" various components or steps, the compositions and methods can also "consist essentially of" or "consist of" the various components and steps. Use of the term "optionally" with respect to any element of a claim means that the element is required, or alternatively, the element is not required, both alternatives being within the scope of the claim.

Numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents, the definitions that are consistent with this specification should be adopted.

Embodiments disclosed herein include:

Embodiment A: A polystyrene (PS) composition for making an extruded foam, the PS composition comprising: a dried PS/alumina compound comprising a PS and an alumina additive, wherein the dried PS/alumina compound has a moisture content, measured by Coulometer, that is less than or equal to about 0.05 weight percent (wt %); and a blowing agent.

Embodiment B: A low density polystyrene (PS) foam produced via extrusion of the PS composition of Embodiment A, wherein the low density PS foam contains a higher blowing agent concentration than that of an otherwise similar low density PS foam produced via extrusion of a PS composition that does not contain the dried PS/alumina compound.

Embodiment C: A low density polystyrene (PS) foam produced via extrusion of the PS composition of Embodiment A, wherein the low density PS foam exhibits at least one superior insulative property relative to that of an otherwise similar low density PS foam produced via extrusion of a PS composition that does not contain the dried PS/alumina compound.

Embodiment D: A low density polystyrene (PS) foam produced via extrusion of the PS composition of Embodiment A, wherein the low density PS foam exhibits at least one mechanical property that is at least comparable to that of an otherwise similar low density PS foam produced via extrusion of a PS composition that does not contain the dried PS/alumina compound.

Embodiment E: A low density polystyrene (PS) foam produced via extrusion of the PS composition of Embodiment A, wherein the blowing agent comprises one or more hydrofluoroolefins (HFOs), and wherein the low density PS foam exhibits at least one insulative property that is at least equivalent to that of an otherwise similar low density PS foam produced via extrusion of a PS composition that does not contain the dried PS/alumina compound and comprises one or more blowing agents selected from the group consisting of hydrofluorocarbons (HFCs).

Embodiment F: A method of producing a low density polystyrene (PS) foam, the method comprising: forming a polystyrene (PS)/alumina compound comprising a PS and an alumina additive; removing moisture from the PS/alumina compound to form a dried PS/alumina compound, wherein the dried PS/alumina compound has a moisture content, measured by a Coulometer, that is less than or equal to about 0.05 weight percent (wt %); blending the dried PS/alumina compound, a blowing agent, and optionally one or more additional additives to form a foamable mixture; and producing a foam by extruding the foamable mixture through a die and into a region of reduced pressure.

Embodiment G: A low density polystyrene (PS) foam produced via the method of Embodiment F.

Embodiment H: The low density PS foam of Embodiment G, wherein the low density PS foam contains a higher blowing agent concentration and/or exhibits at least one superior insulative or mechanical property relative to that of an otherwise similar low density PS foam produced via extrusion of a foamable mixture that does not contain the dried PS/alumina compound.

Embodiment I: A dried polystyrene (PS)/alumina compound for making an extruded foam, the dried PS/alumina compound comprising an extrusion mixture of a PS and an alumina additive, wherein the extrusion mixture has been dried to provide the dried PS/alumina compound such that the dried PS/alumina compound has a moisture content, measured by a Coulometer, of less than or equal to about 0.05 weight percent (wt %), wherein the dried PS/alumina compound comprises from about 0.01 to about 20.0 weight percent (wt %) of the alumina additive.

J: A low density polystyrene (PS) foam produced via extrusion of a PS composition comprising: a dried PS/alumina compound comprising a PS and an alumina additive, wherein the dried PS/alumina compound has a moisture content, measured by Coulometer, that is less than or equal to about 0.05 weight percent (wt %); and a blowing agent, wherein the PS composition comprises greater than or equal to about 7 weight percent of the blowing agent.

Each of embodiments A, B, C, D, E, F, G, H, I, and J may have one or more of the following additional elements: Element 1: wherein the dried PS/alumina compound comprises from about 0.01 to about 20.0 weight percent (wt %) of the alumina additive. Element 2: wherein the alumina additive comprises Sasol CATAPAL® C1. Element 3: wherein the PS comprises crystal polystyrene, high impact polystyrene (HIPS), PS copolymers, or a combination thereof. Element 4: wherein the PS copolymer contains a metallic monomer, glycidyl methacrylate, 2-hydroxyethyl methacrylate, acrylonitrile, or a combination thereof. Element 5: wherein the PS has a melt flow rate (MFR), as measured by ASTM D-1238 in the range of from 0.2 to 30 grams (g)/10 minutes (min). Element 6: further comprising an additive comprising glycerol monostearate (GMS), glycerol tri-stearate (GTS), mineral oil (MO), epoxidized soy oil (ESO), epoxidized polybutadiene, or a combination thereof. Element 7: comprising from about 0.01 to 10.0 weight percent (wt %) of the additive, the weight percentages being based on the total amount of the polystyrene and the additive in the PS composition. Element 8: further comprising an additive selected from the group consisting of antioxidants, flame retardants, and combinations thereof. Element 9: wherein a solubility of the blowing agent in the PS composition is greater than or equal to about 7 weight percent. Element 10: wherein the blowing agent is selected from the group consisting of hydrofluorocarbons (HFCs), hydrofluoroolefins (HFOs), carbon dioxide ($CO_2$), and combinations thereof. Element 11: wherein the dried polystyrene (PS)/alumina compound comprises from about 0.01 to about 20.0 weight percent (wt %) of the alumina additive. Element 12: wherein the solubility of the blowing agent in the foamable mixture is at least 5, 10, 15, or 20% greater than the solubility of the blowing agent in an otherwise similar foamable mixture produced without the dried PS/alumina compound. Element 13: wherein the one or more additional additives are selected from the group consisting of glycerol monostearate (GMS), glycerol tri-stearate (GTS), mineral oil (MO), epoxidized soy oil (ESO), epoxidized polybutadiene, flame retardants, antioxidants, and combinations thereof. Element 14: wherein the blowing agent comprises one or more hydrofluoroolefins, and wherein the low density PS foam exhibits at least one insulative property that is at least equivalent to that of an otherwise similar low density PS foam produced via extrusion of a foamable mixture that does not contain the dried PS/alumina compound and comprises one or more blowing agents selected from the group consisting of hydrofluorocarbons (HFCs). Element 15: wherein the blowing agent comprises one or more hydrofluorocarbons (HFCs) or one or more hydrofluoroolefins (HFOs), and wherein the low density PS foam comprises a higher concentration of the blowing agent relative to that of an otherwise similar low density PS foam produced via extrusion of a foamable mixture that does not contain the dried PS/alumina compound. Element 16: further comprising an additional blowing agent selected from the group consisting of hydrocarbons, $CO_2$, and combinations thereof.

While preferred embodiments of the invention have been shown and described, modifications thereof can be made by one skilled in the art without departing from the teachings of this disclosure. The embodiments described herein are exemplary only, and are not intended to be limiting. Many variations and modifications of the invention disclosed herein are possible and are within the scope of the invention.

Numerous other modifications, equivalents, and alternatives, will become apparent to those skilled in the art once the above disclosure is fully appreciated. It is intended that the following claims be interpreted to embrace all such modifications, equivalents, and alternatives where applicable. Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method of producing a polystyrene (PS) composition for making an extruded foam, the method comprising:

forming a polystyrene (PS)/alumina compound comprising a PS and an alumina additive;

removing moisture from the PS/alumina compound to form a dried PS/alumina compound comprising the PS and the alumina additive, wherein the dried PS/alumina compound has a moisture content, measured by Coulometer, that is less than or equal to about 0.05 weight percent (wt %); and blending the dried PS/alumina compound and a blowing agent to form the PS composition.

2. The method of claim 1, wherein the dried PS/alumina compound comprises from about 0.01 to about 20.0 weight percent (wt %) of the alumina additive.

3. The method of claim 1, wherein the alumina additive comprises from about 64 to about 80 weight percent (wt %) aluminum oxide ($Al_2O_3$).

4. The method of claim 1, wherein the PS comprises crystal polystyrene, high impact polystyrene (HIPS), PS copolymers, or a combination thereof.

5. The method of claim 4, wherein the PS copolymer contains a metallic monomer, glycidyl methacrylate, 2-hydroxylethyl methacrylate, acrylonitrile, or a combination thereof.

6. The method of claim 1, wherein the PS has a melt flow rate (MFR), as measured by ASTM D-1238 in the range of from 0.2 to 30 grams (g)/10 minutes (min).

7. The method of claim 1 further comprising an additive comprising glycerol monostearate (GMS), glycerol tri-stearate (GTS), mineral oil (MO), epoxidized soy oil (ESO), epoxidized polybutadiene, or a combination thereof.

8. The method of claim 7, wherein the PS composition comprises from about 0.01 to 10.0 weight percent (wt %) of the additive, the weight percentages being based on the total amount of the polystyrene and the additive in the PS composition.

9. The method of claim 1, wherein a solubility of the blowing agent in the PS composition is greater than or equal to about 7 weight percent.

10. A method of producing a low density polystyrene (PS) foam, the method comprising extruding the PS composition of claim 1, wherein the low density PS foam contains a higher blowing agent concentration than that of an otherwise similar low density PS foam produced via extrusion of a PS composition that does not contain the dried PS/alumina compound.

11. The method of claim 10, wherein the blowing agent consists of hydrofluorocarbons (HFCs), hydrofluoroolefins (HFOs), carbon dioxide ($CO_2$), or a combination thereof.

12. A method of producing a low density polystyrene (PS) foam, the method comprising:

forming a polystyrene (PS)/alumina compound comprising a PS and an alumina additive;

removing moisture from the PS/alumina compound to form a dried PS/alumina compound, wherein the dried PS/alumina compound has a moisture content, measured by a Coulometer, that is less than or equal to about 0.05 weight percent (wt %);

blending the dried PS/alumina compound, a blowing agent, and optionally one or more additional additives to form a foamable mixture; and producing a foam by extruding the foamable mixture through a die and into a region of reduced pressure.

13. The method of claim 12, wherein the dried polystyrene (PS)/alumina compound comprises from about 0.01 to about 20.0 weight percent (wt %) of the alumina additive.

14. The method of claim 12, wherein the solubility of the blowing agent in the foamable mixture is at least 5, 10, 15, or 20% greater than the solubility of the blowing agent in an otherwise similar foamable mixture produced without the dried PS/alumina compound.

15. The method of claim 12, wherein the low density PS foam contains a higher blowing agent concentration and/or exhibits at least one superior insulative or mechanical property relative to that of an otherwise similar low density PS foam produced via extrusion of a foamable mixture that does not contain the dried PS/alumina compound.

16. The method of claim 12, wherein the blowing agent comprises one or more hydrofluoroolefins, and wherein the low density PS foam exhibits at least one insulative property that is at least equivalent to that of an otherwise similar low density PS foam produced via extrusion of a foamable mixture that does not contain the dried PS/alumina compound and comprises one or more blowing agents selected from the group consisting of hydrofluorocarbons (HFCs).

17. The method of claim 12, wherein the blowing agent comprises one or more hydrofluorocarbons (HFCs) or one or more hydrofluoroolefins (HFOs), and wherein the low density PS foam comprises a higher concentration of the blowing agent relative to that of an otherwise similar low density PS foam produced via extrusion of a foamable mixture that does not contain the dried PS/alumina compound.

18. The method of claim 17, wherein the PS composition further comprises an additional blowing agent selected from the group consisting of hydrocarbons, $CO_2$, and combinations thereof.

19. A method of producing a low density polystyrene (PS) foam, the method comprising:
    removing moisture from a polystyrene (PS)/alumina compound comprising a PS and an alumina additive to form a dried PS/alumina compound comprising the PS and the alumina additive, wherein the dried PS/alumina compound has a moisture content, measured by Coulometer, that is less than or equal to about 0.05 weight percent (wt %);
    blending the dried PS/alumina compound, a blowing agent, and one or more additional additives to form a PS composition; and
    extruding the PS composition,
    wherein the PS composition comprises greater than or equal to about 7 weight percent of the blowing agent.

20. The method of claim 19, wherein the low density PS foam contains a higher blowing agent concentration and/or exhibits at least one superior insulative or mechanical property relative to that of an otherwise similar low density PS foam produced via extrusion of a PS composition that does not contain the dried PS/alumina compound.

\* \* \* \* \*